US006652633B2

(12) United States Patent
Pasek et al.

(10) Patent No.: US 6,652,633 B2
(45) Date of Patent: Nov. 25, 2003

(54) FIRE RETARDANT

(75) Inventors: Eugene A. Pasek, Fayetteville, GA (US); Susan M. Thomason, Covington, GA (US)

(73) Assignee: Arch Wood Protection, Inc., Conley, GA (US)

( * ) Notice: Subject to any disclaimer, the term of this patent is extended or adjusted under 35 U.S.C. 154(b) by 0 days.

(21) Appl. No.: 10/008,526

(22) Filed: Nov. 8, 2001

(65) Prior Publication Data

US 2002/0168476 A1 Nov. 14, 2002

Related U.S. Application Data

(60) Provisional application No. 60/272,606, filed on Mar. 1, 2001.

(51) Int. Cl.[7] .......................... C09K 21/10; C09K 21/12

(52) U.S. Cl. ................................ 106/18.13; 106/15.05; 106/18.14; 106/18.15; 252/601; 252/607

(58) Field of Search ........................... 106/15.05, 18.13, 106/18.14, 18.15; 252/601, 607

(56) References Cited

U.S. PATENT DOCUMENTS

| | | | | |
|---|---|---|---|---|
| 2,642,371 A | | 6/1953 | Fahrni | |
| 2,686,143 A | | 8/1954 | Fahrni | |
| 2,917,408 A | | 12/1959 | Goldstein et al. | |
| 2,935,471 A | | 5/1960 | Aarons et al. | |
| 3,137,607 A | | 6/1964 | Goldstein et al. | |
| 3,159,503 A | | 12/1964 | Goldstein et al. | |
| 3,832,316 A | | 8/1974 | Juneja | |
| 3,874,990 A | | 4/1975 | Surdk | |
| 4,010,296 A | | 3/1977 | Oberley | |
| 4,039,645 A | | 8/1977 | Coyle | |
| 4,163,820 A | | 8/1979 | Corver et al. | |
| 4,168,175 A | * | 9/1979 | Shutt | 106/15.05 |
| 4,373,010 A | | 2/1983 | Oberley | |
| 4,467,056 A | * | 8/1984 | Staendeke et al. | 523/208 |
| 4,504,603 A | * | 3/1985 | Hicks | 521/85 |
| 5,213,783 A | * | 5/1993 | Fukumura et al. | 423/305 |
| 5,922,296 A | * | 7/1999 | Blasius | 423/279 |

FOREIGN PATENT DOCUMENTS

CA 917334 CA 12/1972

* cited by examiner

*Primary Examiner*—Anthony J. Green
(74) *Attorney, Agent, or Firm*—King & Spalding LLP; Clark G. Sullivan

(57) ABSTRACT

Improved fire retardants that include guanylurea phosphate [($H_2N$—C(NH)—NH—C(O)—$NH_2$).$H_3PO_4$] (GUP) and boric acid, materials such as wood and composite wood products that include these fire retardants, and methods of making and using same.

32 Claims, 6 Drawing Sheets

FIRE RETARDANT

RELATION TO PRIOR APPLICATIONS

This application claims priority to U.S. Provisional Patent Application No. 60/272,606, filed Mar. 1, 2001.

FIELD OF THE INVENTION

This invention is in the area of improved fire retardants that include guanylurea phosphate [($H_2N$—C(NH)—NH—C(O)—$NH_2$).$H_3PO_4$] (GUP) and boric acid, to materials, including wood and composite wood products that include these fire retardants, and to methods of making and using same.

BACKGROUND OF THE INVENTION

Wood products, especially wood products used in the building construction industry, are commonly treated with chemical fire retardants that reduce the inherent ability of the wood to catch fire and combust. Many of these fire retardants contain acidic components which, when exposed to high heat, are activated and catalyze the dehydration of cellulose. This reaction converts the cellulose in the wood into water and char, and reduces the susceptibility of the wood to continuous combustion. Because these acid-based fire retardants decompose the wood in order to prevent combustion, it is important to prevent premature activation of the acid components. This is especially true for building products that are used to construct roofs, because of the extremely hot temperatures that these materials experience.

Many fire retardant chemical treatments for wood have been based on amine-phosphorus compounds.

For example, Goldstein et al., U.S. Pat. No. 2,917,408 disclose the preparation of fire retardant wood with a combination of dicyandiamide ($H_2N$—C(NH)—NH—CN) and phosphoric acid ($H_3PO_4$). Goldstein et al., U.S. Pat. No. 3,159,503 disclose the preparation of fire retardant wood with a combination of dicyandiamide, phosphoric acid and very small amounts of formaldehyde. In addition, Juneja, U.S. Pat. No. 3,832,316 discloses a composition for imparting fire retardancy to wood comprising dicyandiamide, melamine, formaldehyde, and phosphoric acid and suggests that minor amounts of other materials may be substituted for some of the phosphoric acid, such as boric acid. Juneja, Canadian Pat. No. 917,334 discloses a composition for treating wood to impart fire retardancy, in which the composition comprises dicyandiamide, urea, formaldehyde and phosphoric acid. The document suggests that minor amounts of other materials may be substituted for some of the phosphoric acid, such as boric acid. Other similar patents include U.S. Pat. Nos. 2,935,471; 3,137,607; 3,874,990 and 4,010,296.

While most of the above described chemical compositions based on dicyandiamide, melamine, urea, formaldehyde and phosphoric acid are effective for imparting fire retardancy to wood, they suffer from one or more drawbacks. Compositions containing solids of more than about 15 percent urea render the wood hygroscopic. Further, compositions that contain formaldehyde tend to be resinous and require high drying temperatures of about 100° C. to 110° C. to completely cure the resin, thereby impairing the strength of the wood.

U.S. Pat. No. 4,373,010 to Oberley (the Oberley '010 patent) reported that the aforesaid disadvantages could be obviated, and that a superior fire retardant could be formed, by partially reacting water, phosphoric acid, dicyandiamide and boric acid. The Oberley '010 patent describes several liquid fire retardants that contain guanylurea phosphate (GUP) and boric acid, and several methods for preparing the GUP/boric acid retardants. The retardants preferably contain about 70 weight parts of GUP and about 30 weight parts of boric acid. Dicyandiamide and phosphoric acid are mixed at a 1:1 molar ratio to produce the GUP.

In a preferred method, Oberley '010 reacts dicyandiamide with phosphoric acid for 35 to 45 minutes in water to form guanylurea phosphate (GUP), in a solution that contains 50–70 percent solids. The reaction is only allowed to proceed to about 80–95 percent completion, in order to prevent the formation of insoluble precipitates. Boric acid is then mixed with the GUP solution, and the mixture cooled to ambient temperature and diluted to from 3 to 18 percent solids.

In one example, Oberley '010 formed a 15 percent aqueous treating solution from dicyandiamide, phosphoric acid and boric acid (DPB) in a ratio of 70 percent combined dicyandiamide and phosphoric acid to 30 percent boric acid. While agitating, the dicyandiamide was charged to a glass reaction flask, followed by the water and phosphoric acid. The mixture was then heated to 80° C. over a period of 20 minutes and maintained at that temperature for 3½ hours. The boric acid was then added and the solution cooled to room temperature over a period of 30 minutes. The resultant solution comprised principally guanylurea phosphate, unreacted dicyandiamide and phosphoric acid of about 10 percent of the original amount, and boric acid.

In another method disclosed in the Oberley '010 patent, dicyandiamide, phosphoric acid, and boric acid are initially heated together. The patent does not give any further details about this process, except to indicate that the method is prone to yield aqueous mixtures with insoluble precipitates, especially at high solids concentrations of from 50 to 80 percent.

At least one other method, that is not disclosed in the Oberley '010 patent, is used commercially to prepare a GUP/boric acid fire retardant. This method is used to produce solid GUP/boric acid fire retardants that are bagged and sold in large super sacks for pressure treatment of wood products. To use the solid material, pressure treaters pour the contents of the bag into a large vat of heated pressure treating solution, and allow the solids to dissolve before using the solution in their pressure treating operation.

These commercially available solid GUP/boric acid fire retardants are sold in large super sacks of chunks that are 0.5–1.5 inches in size. The solids contain boric acid and GUP, and result from a reaction that gives about 90% yield, and are typically sold. When a wood pressure treater receives a super sack of solid GUP/boric acid fire retardant, he dissolves the entire bag in water for use in his pressure treatment process.

The GUP/boric acid fire retardants disclosed and used in the prior art suffer from a number of disadvantages. First and foremost, the process for making the fire retardants wastes a considerable amount of raw materials. In the commercial process discussed above, about 10% of the dicyandiamide and phosphoric acid raw materials is wasted because the reaction only proceeds to about 90% of its theoretical yield. Oberley '010 intentionally wastes a considerable amount of raw materials by preventing more than 80–95% conversion of dicyandiamide and phosphoric acid into GUP. As a result, the pressure treater ends up with raw materials and intermediates from the GUP production process in his wood products.

The GUP/boric acid fire retardants of the prior art also contain unwanted by-products from the GUP production process. One of these by-products is seen when a solution of the fire retardant is subjected to potentiometric titration, because it produces an equivalence point at pKa 3.2. It is believed that this by-product is a salt of dicyandiamide and phosphoric acid. A purer product that did not contain such by-products and unreacted raw materials would be desirable from a quality point of view.

The solid GUP/boric acid fire retardants that are sold commercially also suffer from a number of distinct disadvantages. For example, they are presently sold in super sacks and are very difficult to manage by the wood treater, because they frequently harden during transport in the bag, and an entire bag of the material must be added to a pressure treating solution in order to assure adequate and proportional mixing between the GUP and boric acid. A homogenous blend of solids would reduce the packaging that is needed when a customer needs a smaller portion of material than present in a super sack, because a homogenous blend would allow customers to use only a portion of the retardant in the super sack packaging (as opposed to having to dissolve an entire super sack).

The liquid fire retardants disclosed in Oberley '010 similarly suffer from several distinct disadvantages, especially related to transportation of the materials. In order to prevent the formation of undesirable precipitates during transport, the liquid fire retardants disclosed in Oberley '010 must be continuously heated during transport and/or diluted to unsatisfactory low levels.

The GUP/boric acid fire retardants disclosed and used in the prior art also do not meet the needs of the manufacturers of oriented strand board (OSB) and other composite wood products. Methods for producing composite wood products such as oriented strand board are known. In general, particles of wood of various sizes and geometrical configurations are consolidated using various glue or binder mixes such as isocyanate, urea formaldehyde, phenol formaldehyde, melamine formaldehyde, acid phenol resins, etc., under heat and pressure. Typical processes are described in U.S. Pat. No. 2,642,371 issued Jun. 23, 1953, to Fahrni, and U.S. Pat. No. 2,686,143, issued Aug. 10, 1954, to Fahrni. The particles of wood chips, strands, fibers, or other cellulosic material, are typically referred to as the furnish.

There are several methods currently used to impart fire retardance to composite wood products. U.S. Pat. No. 4,163,820 reports that, as then practiced, most methods for imparting flame-retardance to wood particleboard involve the treatment of the wood chips used with an aqueous fire-retardant solution, followed by chip drying and finally chip gluing and particleboard consolidation. The patent also reports that other methods wherein the wood chips are dusted with solid frame-retardant additive are also practiced although less actively.

U.S. Pat. No. 4,039,645 reports that it is known in the art to use borates in the production of composite wood products. One method used is to treat the green chips with $Na_2B_8O_{13}.4H_2O$, either in solution or as a dry powder. It is then conventional to add powdered boric acid, $H_3BO_3$, into the resin mix prior to using the resin mix to consolidate the treated wood chips. The addition of the boric acid to the glue mix is required since all sodium borates such as $Na_2B_8O_{13}.4H_2O$ have a relatively high pH which interferes with the binding of resin to the wood chips. Solution-based fire retardants, such as those disclosed in the Oberley '010 patent, cannot be used to treat finished composite wood products because the products are dimensionally unstable when contacted with water. The solution can only be used to treat oriented strand board if individual chips are treated and dried before board formation. This, however, is an expensive time consuming step. It would be more efficient if the retardant could simply be mixed with the furnish during board formation.

The commercially available solid GUP/boric acid fire retardants also can only be used to treat composite wood products if dissolved, and used to individually treat the wood chips before board formation. The solids are not in an appropriate form to mix with the furnish because, as noted above, they are typically cut into 0.5–1.5 inch chunks which do not mix with the fine materials present in the composite wood furnish. Moreover, because of their structure and stickiness, the prior art solids do not flow well, and thus cannot be mixed with materials such as composite wood furnish with any level of precision. Even if they could mix well, the chunks themselves are so dishomogenous that a homogenous distribution of GUP and boric acid throughout the furnish could not be expected. In addition, GUP is very difficult to size once formed, due to its low melting point and the heat developed during the sizing or grinding operation.

It is an object of the invention, therefore, to provide improved flame retardants.

It is another object of the invention to provide superior fire retardance to wood and other cellulosic products.

It is another object of the invention to provide improved methods for preparing flame retardants.

Still another object is to provide novel flame retardant compositions that can be used in the manufacture of composite wood products, and to composite wood products produced with such compositions.

SUMMARY OF THE INVENTION

Guanylurea phosphate/boric acid compositions are provided that exhibit improved properties for the treatment of material for flame retardancy.

In one embodiment the invention provides an improved GUP/boric acid formulation that exhibits at least one of the following characteristics:

(i) greater than 95, 96, 97, 98 and preferably greater than 99 percent purity;

(ii) homogeneous distribution of GUP and boric acid in formulation;

(iii) solubility of at least 70 percent in water; and (iv) less than 5, 2 and preferably 1 percent of a salt, such as the salt of dicyandiamide and phosphoric acid.

In a second embodiment, the GUP/boric acid composition exhibits at least two, three, or all four of these characteristics.

These GUP/boric acid fire retardants have superior purity, homogeneity, and performance characteristics. The GUP/boric acid is provided in substantially pure form, i.e. greater than 95% free of unwanted by-products and unreacted starting materials, and preferably greater than 96%, 97%, 98%, or 99% pure. The GUP and boric acid are evenly dispersed for superior fire retardance and longevity, especially in high hazard applications. The fire retardants can be liquid or solid. In solid form, they can be integrated into composite wood products, and composite wood product manufacturing processes to produce composite wood products of the present invention.

It has been discovered that by achieving linear reaction kinetics between dicyandiamide and phosphoric acid, one is able to substantially increase the yields of GUP in a GUP/boric acid fire retardant production process, and to produce a substantially pure GUP/boric acid fire retardant that does not contain any significant quantities of unwanted by-products or unreacted starting materials. These higher purity products are desired for their superior performance characteristics, and for their more efficient utilization of raw materials. Moreover, solutions produced by the process of this invention can be processed into solids in which the GUP and boric acid are substantially evenly distributed.

It has surprisingly been discovered that the higher purity solids produced by the present invention are less prone to stick together during storage and handling. The stickiness of the prior art solids appears to be attributable to the hygroscopicity of by-products and unreacted residuals from the prior art GUP manufacturing processes and from the GUP itself. Because the GUP of the present invention is purer, and because the particle comprises a substantially homogenous 70:30 composition of GUP and boric acid, it is less sticky, and one is able to prepare solid compositions of particulate fire retardants that flow when subjected to gravitimetric forces. The flowability of the particles is of substantial benefit because it allows GUP and boric acid to be evenly mixed and distributed throughout the composition. It also allows batches to be subdivided without concern over the homogeneity of the batch. Flowability also allows the particles to be used in a number of applications not available to the prior art solids, such as composite wood board manufacture.

It has also been surprisingly discovered that the higher purity products of the present invention exhibit improved solubility in water. The invention provides liquid compositions of GUP/boric acid fire retardant of exceptional purity (greater than 95%, 96%, 97%, 98%, and even 99%), in which all of the retardant can be solubilized, even at concentrations greater than 70 percent fire retardant solids.

Thus, in one embodiment the invention provides solid and liquid fire retardant compositions that contain GUP and boric acid, wherein the amount of unreacted starting materials and unwanted by-products from the GUP reaction process are less than 5 wt. % of the theoretical GUP yield. The amount of such impurities is preferably less than 4% of the theoretical GUP yield, and even more preferably less than 3%, 2% or 1%. The invention also provides wood products that contain the high purity fire retardants, and methods for treating wood products with the high purity fire retardants.

The process for producing the compositions of the present invention can be exemplified by the linear plot of reaction kinetics contained in FIG. 1. These reaction kinetics should be contrasted with prior art processes which, as shown in FIG. 2, exhibit asymptotic reaction kinetics, reaching a maximum yield substantially below the theoretical yield attainable from the reaction of dicyandiamide and phosphoric acid. The present process provides a much more cost-efficient utilization of raw materials in the GUP/boric acid manufacturing process than was attained by the prior art processes, and yields a product that is much purer than the products obtained by the prior art processes.

Thus, the invention also provides a process for producing guanylurea phosphate by reacting dicyandiamide and phosphoric acid under conditions that yield substantially linear reaction kinetics. The reaction is preferably allowed to proceed to at least 95% completion, even more preferably to at least 96% or 97% completion, and still even more preferably to at least 98% or 99% completion. The reaction preferably takes place in an aqueous medium.

In one embodiment, the linear reaction kinetics are attained by dissolving in water, substantially simultaneously, dicyandiamide, phosphoric acid, and boric acid, and reacting at least a portion of the dicyandiamide and the phosphoric acid to form guanylurea phosphate, thereby forming a reaction product solution containing dissolved GUP and dissolved boric acid. The reaction is preferably run by heating the mixture once all three ingredients have been mixed, but not heating the mixture so high as to cause an exotherm, which could cause significant evaporation of the mixture and cause unwanted precipitation of solids.

The invention also provides solid fire retardant compositions in which GUP and boric acid are uniformly dispersed. In one embodiment, the solid composition is a solid particulate that contains both GUP and boric acid. In contrast to the solid compositions that are sold commercially in the prior art, in which large GUP chunks were mechanically added to boric acid solids in super sacks, the present invention provides individual solid particulates in which the GUP and boric acid are uniformly distributed. These homogenous solid compositions are particularly useful in the treatment of wood products, and especially the preparation of OSB and other composite wood products, because of the ease with which they can be mixed with the composite wood furnish, and the homogeneity of the GUP and boric acid that results within the wood product eventually produced. They can also be mixed into an adhesive resin that is used to produce a composite wood product.

Thus, in another embodiment the invention provides a wood product that comprises GUP and boric acid of greater than 95%, 96%, 97%, 98%, or 99% purity. In another embodiment the invention provides a composite wood product such as OSB that comprises GUP and boric acid. The GUP and boric acid is preferably the high purity material that is provided in another aspect of this invention. In still another embodiment the invention provides composite wood furnish, such as wood fibers or chips, or an adhesive resin used to manufacture a composite wood product, that contains GUP and boric acid. In yet another embodiment, the invention provides processes for producing fire-resistant composite wood products by mixing the particulate flame retardant composition with the furnish or adhesive resin in a composite wood production process.

The invention also provides methods of making high purity solid GUP/boric acid fire retardants by dewatering the liquid GUP/boric acid compositions of the present invention. The solution can be dewatered by any known method for separating a solvent from its solute, including by spray drying, thin film drying, and other drying techniques used by those skilled in the art of drying high solids content solutions. A preferred method of dewatering is by spray drying. This method provides a dried product that is spherical and as a result very flowable. Moreover, the product of spray drying is uniform in composition, and dissolves quickly with less heating than conventional products. The uniform, small size of the particles produced by spray drying also allows them to be readily mixed with adhesives, or other raw material furnish used to manufacture composite materials such as OSB. Spray drying also produces particles that do not create dusting problems, because the amount of small fines from the spray drying process is minimal. Thus, the product can be made readily flowable for ease of handling.

Notably, the spray drying process can also be used to manufacture fire retardant particles from materials other than GUP/boric acid. Thus, while the spray drying is preferably carried out with GUP/boric acid fire retardants, and even more preferably carried out with the high purity GUP/boric acid fire retardants otherwise provided by this invention, in another embodiment the invention provides fire retardant particles of any suitable fire retarding composition that satisfy one or more of the physical attributes of particles produced by the spray drying process. Such physical attributes include: (1) particle sphericity, (2) uniformity of size distribution, (3) flowability, (4) small particle size (generally less than 50 microns), and (5) substantial absence of fines. The particles preferably satisfy one of the preferred retardance levels set forth herein.

Thus, in another embodiment the invention provides a fire retardant composition in the form of solid particulates, wherein the composition satisfies one or more of the following characteristics:

a) the composition comprises a plurality of flowable particulates;

b) the composition comprises a plurality of spherical particles;

c) the composition comprises a plurality of particles having a substantially narrow size distribution;

d) the composition comprises a plurality of particles having an average diameter of less than 50 microns;

e) the composition comprises a plurality of particles substantially in the absence of fines.

The composition preferably comprises GUP and boric acid, and the GUP and boric acid are preferably evenly dispersed throughout or within the particules. Moreover, the particulates can also be made from other suitable fire retardants, such as the compositions used to prepare D-Blaze, Pyrolith KD, Pyroguard, FirePro, and other commercially available fire retardants. Preferred fire retardants include ammonium phosphates, ammonium polyphosphates, guanidine phosphate, melamine phosphate, urea phosphates, GUP, phosphoric acid, dicyandiamide, ammonium sulfate, sodium, potassium, or ammonium borates, urea, boric acid, and formaldehyde.

Thus, the invention provides a GUP/boric acid fire retardant that has a high concentration of GUP, and a low concentration of by-products and unreacted residuals from the GUP manufacturing process.

The invention also provides a process for producing GUP/boric acid fire retardants that more effectively utilizes raw materials, and produces higher yields of GUP than prior manufacturing processes, and less unwanted by-products.

The invention further provides wood products impregnated with high purity GUP/boric acid fire retardants that contain low or de minimis amounts of unreacted raw materials and by-products from the GUP reaction process.

The invention also provides solutions of GUP/boric acid fire retardant that include high concentrations of fire retardant.

The invention further provides a solid GUP/boric acid fire retardant in which the GUP and boric acid are substantially evenly dispersed, preferably of high purity.

The invention also provides solid particulates of GUP/boric acid with low hygroscopicity, and which can be used in material treatment processes, including composite board manufacture where flowability of the flame retardant is desired.

The invention also provides composite wood products, and furnish used in the manufacture of composite wood products, that contain GUP/boric acid fire retardants, preferably of high purity.

The invention further provides methods of manufacturing fire retardants for use in the composite wood manufacturing industry, and provides solid particles of fire retardant that can be readily integrated into the manufacture of composite wood products.

DETAILED DISCUSSION OF THE INVENTION

Figure 1:
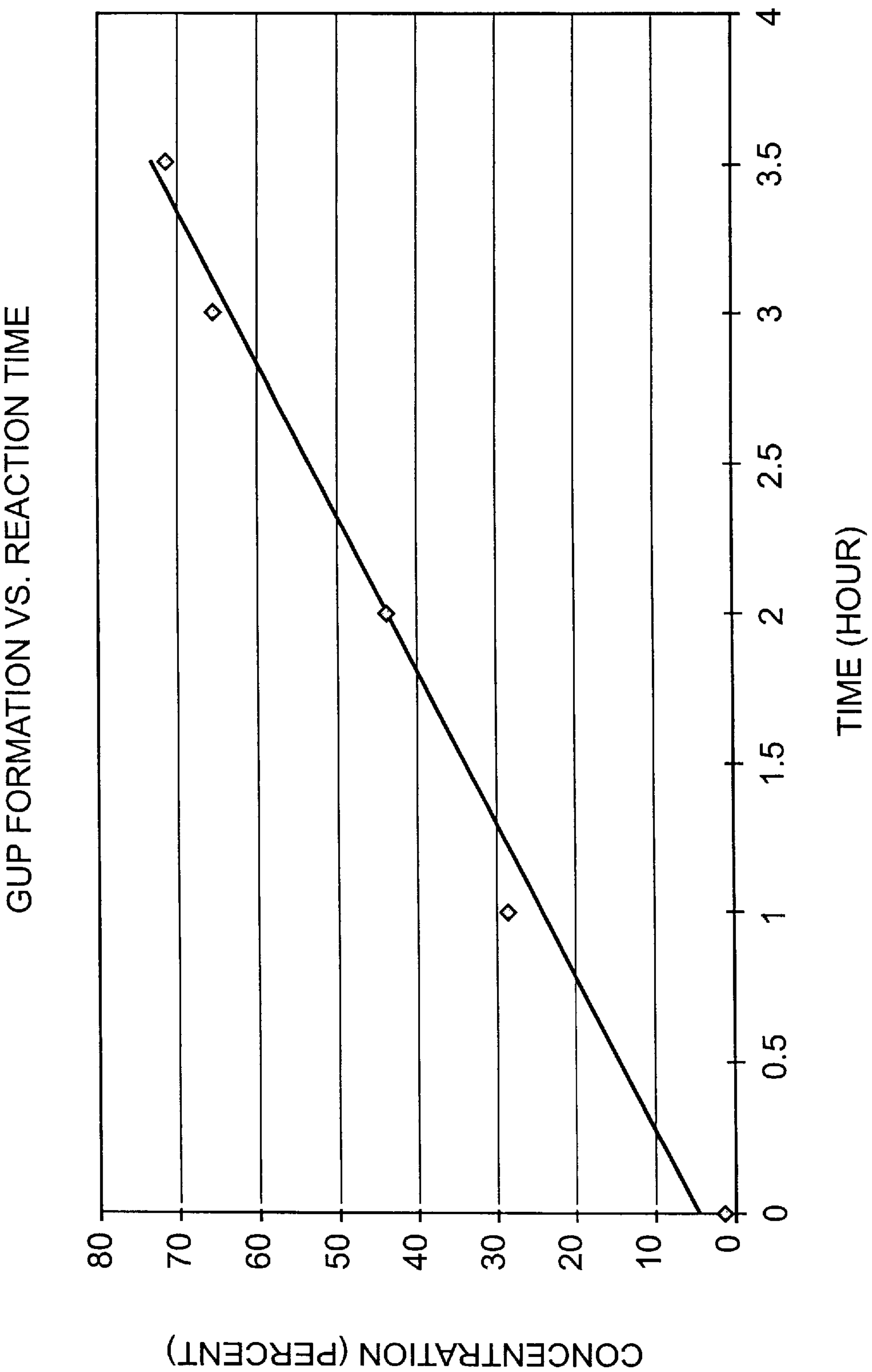
FIG. 1 is a nonlimiting example of linear kinetics that can be achieved when producing the compositions according to the present invention.

Guanylurea phosphate/boric acid compositions are provided that exhibit improved properties for the treatment of material for flame retardancy.

In one embodiment the invention provides an improved GUP/boric acid formulation that exhibits at least one of the following characteristics:

(i) greater than 95, 96, 97, 98 and preferably greater than 99 percent purity;

(ii) homogeneous distribution of GUP and boric acid in a solid formulation;

(iii) solubility of at least 70 percent in water; and (v) less than 5, 2 and preferably 1 percent of a salt, such as the salt of dicyandiamide and phosphoric acid.

In a second embodiment, the GUP/boric acid composition exhibits the following characteristics:

(i) greater than 95, 96, 97, 98 and preferably greater than 99 percent purity; and (ii) homogeneous distribution of GUP and boric acid in formulation.

In a third embodiment, the GUP/boric acid composition exhibits the following characteristics:

(i) greater than 95, 96, 97, 98 and preferably greater than 99 percent purity; and (ii) solubility of at least 70 percent in water.

In a fourth embodiment, the GUP/boric acid composition exhibits the following characteristics:

(i) greater than 95, 96, 97, 98 and preferably greater than 99 percent purity; and (ii) less than 5, 2 and preferably 1 percent of a salt, such as the salt of dicyandiamide and phosphoric acid.

In a fifth embodiment, the GUP/boric acid composition exhibits the following characteristics:

(i) homogeneous distribution of GUP and boric acid in formulation; and (ii) solubility of at least 70 percent in water.

In a sixth embodiment, the GUP/boric acid composition exhibits the following characteristics:

(i) homogeneous distribution of GUP and boric acid in formulation; and (ii) less than 5, 2 and preferably 1 percent of a salt, such as the salt of dicyandiamide and phosphoric acid.

In a seventh embodiment, the GUP/boric acid composition exhibits the following characteristics:

(i) solubility of at least 70 percent in water; and (ii) less than 5, 2 and preferably 1 percent of a salt, such as the salt of dicyandiamide and phosphoric acid.

In an eighth embodiment, the GUP/boric acid composition exhibits the following characteristics:

(i) greater than 95, 96, 97, 98 and preferably greater than 99 percent purity;

(ii) homogeneous distribution of GUP and boric acid in formulation; and (iii) solubility of at least 70 percent in water.

In a ninth embodiment, the GUP/boric acid composition exhibits the following characteristics:

(i) greater than 95, 96, 97, 98 and preferably greater than 99 percent purity;

(ii) solubility of at least 70 percent in water; and (iii) less than 5, 2 and preferably 1 percent of a salt, such as the salt of dicyandiamide and phosphoric acid.

In a tenth embodiment, the GUP/boric acid composition exhibits the following characteristics:

(i) homogeneous distribution of GUP and boric acid in formulation;

(ii) solubility of at least 70 percent in water; and (iii) less than 5, 2 and preferably 1 percent of a salt, such as the salt of dicyandiamide and phosphoric acid.

In an eleventh embodiment, the GUP/boric acid composition exhibits all of the following characteristics:

(i) greater than 95, 96, 97, 98 and preferably greater than 99 percent purity;

(ii) homogeneous distribution of GUP and boric acid in formulation;

(iii) solubility of at least 70 percent in water; and (iv) less than 5, 2 and preferably 1 percent of a salt, such as the salt of dicyandiamide and phosphoric acid.

These desired characteristics can be accomplished, in one embodiment, by carrying out the process reaction in a manner that achieves linear reaction kinetics. It has been discovered that by running the reaction under conditions that achieve linear kinetics, as opposed to the prior art's asymptotic kinetics, a product with superior physical properties for flame retardancy for a wide variety of materials is produced.

The invention provides a substantially pure and homogenous GUP/boric acid fire retardant that does not contain a significant quantity of unwanted by-products or unreacted starting materials. The fire retardants can be made as flowable uniform particulates, which can be employed in the manufacture of composite wood products such as oriented strand board. It has surprisingly been discovered that by achieving linear reaction kinetics between dicyandiamide and phosphoric acid, one is able to increase the yields of usable GUP from a GUP/boric acid fire retardant production process substantially, and to produce compositions of GUP and boric acid in which the GUP and boric acid are substantially evenly dispersed. The invention can be used to produce high purity GUP/boric acid fire retardants in both solid and liquid media.

I. High Purity GUP/Boric Acid Fire Retardants

In one embodiment the invention provides solid and liquid fire retardant compositions that contain GUP and boric acid wherein the GUP/boric acid is in substantially pure form and thus contains minimal amounts of unreacted starting materials and unwanted by-products from the GUP reaction process. In a preferred embodiment, the amount of unreacted starting materials and unwanted by-products is less than 5 wt. % of the theoretical yield. In even more preferred embodiments, the amount of such impurities is less than 4%, 3%, 2%, or even 1% of the theoretical yield.

One particular by-product of the prior art process of the Oberley '010 patent is revealed when the GUP/boric acid solution made according to that process is titrated potentiometrically, because it exhibits an equivalence point at a pKa of about 3.2. It is believed that this equivalence point is caused by the presence of a dicyandiamide/phosphoric acid salt in the end product. It is also believed that this salt contributes to the hygroscopicity of the product, and hence its stickiness. The higher purity products of the present invention do not exhibit this pKa equivalence point. Thus, in another embodiment the invention provides compositions of GUP and boric acid that do not exhibit an equivalence point at a pKa of about 3.2. In still another embodiment the invention provides a GUP/boric acid fire retardant substantially in the absence of a dicyandiamide/phosphoric acid salt.

The invention also provides fire retardants that have superior solubility. As mentioned above, the process of the present invention is capable of producing liquid compositions of GUP/boric acid fire retardant of exceptional purity (greater than 95%), in which all of the retardant is solubilized, even at concentrations to 70% fire retardant solids. This is a very important feature in conventional solution treating operations such as pressure treating because, when higher solids concentrations can be employed, less time and energy is required to dry the treated product. This is also important because one can more readily dewater liquid solutions to obtain solid GUP/boric acid compositions.

Thus, in one embodiment, the invention provides an aqueous GUP/boric acid solution capable of being concentrated to greater than about 70% and even 75% solids without the formation of visible precipitates. In another embodiment the invention provides solid GUP/boric acid compositions capable of being solubilized in aqueous solutions to greater than about 70% and even 75% solids without the formation of visible precipitates. The percentage of solids refers to the amount of solids obtained when the solvent is evaporated from a solution, expressed as a ratio of the weight of such solids to the weight of the solution before evaporation.

GUP and boric acid can be present in the composition in any proportion that imparts fire retardant properties. In one embodiment, the composition comprises from about 20 to about 40 weight parts boric acid, and from about 60 to about 80 weight parts of the reaction product of dicyandiamide and phosphoric acid. In another embodiment, the composition comprises from about 25 to about 35 weight parts boric acid, and from about 65 to about 75 weight parts of the reaction product of dicyandiamide and phosphoric acid. In still another embodiment the composition comprises from about 28 to about 32 weight parts boric acid, and from about 68 to about 72 weight parts of the reaction product of dicyandiamide and phosphoric acid, and preferably about 30 weight parts boric acid and about 70 weight parts of the reaction product of dicyandiamide and phosphoric acid.

For purposes of this invention, the term "fire retardant" refers to a composition which, when impregnated into wood products at levels commonly observed in the wood processing industry, imparts a measurable level of fire retardance to the wood product. Fire retardants thus include all compounds which, when applied to cellulose containing materials, result in treated cellulose containing materials which will not burn, or such treated materials will burn to a lesser degree than untreated materials, or the burning of such treated materials will be limited to a smaller area when compared to untreated materials. Example 4 sets forth two methods for evaluating the level of fire retardance imparted by the composition. In one embodiment, the composition qualifies as a fire retardant if it reduces the loss of original weight by greater than 10%, 30% or 50%, when analyzed by the method of Example 5. In another embodiment, the composition qualifies as a fire retardant if it reduces the char area over a control by greater than 10%, 30% or 50%, again as determined by the method of Example 5.

The term "percentage of theoretical yield" refers to the quantity of unreacted starting material and by-products from the dicyandiamide/phosphoric acid reaction, expressed as a percentage of the weight of GUP which would result from 100% theoretical conversion of dicyandiamide and phosphoric acid to GUP. When calculating the percentage, any stoichiometrically excessive raw material that is added to the reaction mix, either intentionally or unintentionally, is excluded.

The term "phosphoric acid" as used herein includes all of the oxy acids and anhydrides of phosphorus. The term phosphoric acid thus includes such forms as $H_3PO_4$, $H_3PO_3$, $2H_3PO_4.H_2O$, $H_4P_2O_7$, $H_4$ $P_2O_6$, $HPO_3$, $P_2O_3$ and $P_2O_5$ and mixtures of the above.

The term "boric acid" as used herein includes $B(OH)_3$, $HBO_2$, $HBO_3$, $H_2B_4O_7$, $B_2O_3$, and mixtures of the above.

Dicyandiamide refers to $H_2NC(NH)NHCN$.

Guanylurea phosphate, or GUP, refers to $(H_2N—C(NH)—NH—C(O)—NH_2).H_3PO_4$.

II. Solid and Particulate Fire Retardant Compositions

The invention also provides particulate solid fire retardant compositions that satisfy one or more of the following physical attributes: (1) particle sphericity, (2) uniformity of size distribution, (3) flowability, (4) average particle size less than 50 microns, (5) substantial absence of fines, and (6) uniformity of composition. These particles are especially well adapted for use in the impregnation of cellulosic materials, including the manufacture of composite wood products.

Any type of fire retardant composition can be used to make the particulate fire retardants of the present invention, including boric acid, the various salts of boric acid, and salts and acids of phosphates, sulfates, polyphosphates, phosphonites, and phosphonates. Still other fire retardants include dicyandiamide, GUP, boric acid, urea, and formaldehyde. In a particularly preferred embodiment, however, the fire retardant is a GUP/boric acid composition that satisfies one or more of the requirements discussed herein such as purity, homogeneity, and/or GUP/boric acid proportion.

In one embodiment the invention provides solid fire retardant particles having a substantially narrow distribution of particle sizes. In one embodiment at least about 50% of the particles have a size within 75% of the median particle size. In another embodiment at least about 50% of the particles have a size within 50% of the median particle size.

In another aspect the particulates of the present invention are flowable. For example, when the solid fire retardants are provided as particulates less than 150, 100, 75, 50, 40, 30, or 20 microns in size, they readily flow past one another when subjected to gravitimetric forces. Thus, in one embodiment the invention provides solid GUP/boric acid fire retardants that do not stick together, and are thus flowable, as measured by their ability to readily flow past one another when formulated as particulates.

A particulate composition is said to readily flow, or be flowable, if it flows through a tapered circular orifice as small as 3, 1 or ½ inches in diameter without substantial agitation. The tapered orifice should be configured to form a 90 circular funnel.

In another aspect the particulate fire retardants can be defined by their average diameter. Thus, in one embodiment the particulates have, on average, a size less than 75 microns in diameter, more preferably less than 50 microns in diameter, and even more preferably less than 40, 30, or 25 microns in diameter. Preferably, at least 50, 75, or 95% of the particles have a size within one of the foregoing size ranges.

As mentioned above, the compositions of the present invention preferably comprise GUP and boric acid. The solid compositions that comprise GUP and boric acid can be present as particulates or other solid forms (such as the 0.5–1.5 inch chunks sold commercially in the prior art). Regardless of whether the GUP/boric acid solids are present as particulates or other solid form, in a preferred aspect the guanylurea phosphate and boric acid are substantially evenly dispersed throughout the solid composition. Thus, in another embodiment the invention provides a solid fire retardant composition comprising guanylurea phosphate and boric acid, wherein the guanylurea phosphate and boric acid are distributed substantially evenly throughout the composition.

Even distribution of guanylurea phosphate and boric acid in the composition is achieved in at least two ways. In one embodiment, the invention provides solid particles of fire retardants in which the discrete particles contain both GUP and boric acid. Thus, in one sense the solid composition is a discrete particulate, and the GUP and boric acid are substantially evenly distributed within the discrete particle.

In another embodiment, the invention provides compositions of a plurality of solid particles, in which the GUP and boric acid are substantially evenly dispersed throughout the plurality of particles. Even distribution is achieved on this larger scale, when the solids are present as a plurality of particulates, because the particulates are capable of flowing past one another and being mixed to a substantial even distribution of GUP and boric acid. Thus, in another sense the solid composition of the instant invention is a plurality of particles which, in toto, comprise both GUP and boric acid. The composition of the individual particles can vary as long as the plurality of particles is sufficiently mixed.

In a preferred embodiment, however, substantially all of the particles comprise both GUP and boric acid. In more preferred embodiments at least 95%, 96%, 97%, 98%, or 99% of the particles contain both GUP and boric acid. In an even more preferred embodiment, the percentage of particles discussed above that comprise both GUP and boric acid, comprise GUP and boric acid at the preferred ratios discussed herein.

III. Methods of Making the Compositions of the Present Invention

The invention also provides methods of making GUP/boric acid fire retardants. Some of these methods relate to the manufacture of particulate fire retardants in general, and these methods are not limited to GUP and boric acid compositions, but include methods of manufacturing particulate fire retardants from any fire retardant composition.

In one embodiment, the invention provides a process for producing guanylurea phosphate by reacting dicyandiamide and phosphoric acid under conditions that yield linear reaction kinetics. The reaction is preferably allowed to proceed to at least 95% completion, even more preferably to at least 96%, 97% or 98% completion, and still even more preferably to at least 99% completion.

In one embodiment, the linear reaction kinetics are attained by dissolving in water, substantially simultaneously, dicyandiamide, phosphoric acid, and boric acid, and reacting at least a portion of the dicyandiamide and the phosphoric acid at an elevated temperature to form guanylurea phosphate, thereby forming a reaction product solution containing dissolved GUP and dissolved boric acid. As used herein, the term "substantially simultaneously" means that the components are all added before any of the components have had time to substantially react together. More specifically, dicyandiamide, phosphoric acid, and boric acid are all added before holding the mixture at elevated temperature for a time sufficient to react any substantial amount of the dicyandiamide and phosphoric acid.

In practicing the process of the invention, a reaction product solution is typically prepared by mixing dicyandiamide, phosphoric acid, and boric acid in water, and by heating the mixture (usually with stirring) to dissolution. The mole ratio of dicyandiamide to phosphoric acid added to the mixture is typically from about 0.8:1 to about 1.3:1. The mole ratio of boric acid to (dicyandiamide plus phosphoric acid) added to the mixture is typically from about 0.2:1 to about 1.5:1. Typically the solution is heated to a temperature ranging from about 45° C. to about 100° C., more particularly from about 95° C. to about 98° C., typically for a time period ranging from about the time of dissolution of the solids to about 5 hours after dissolution. The solution is preferably heated enough to drive the reaction, but not so much as to make a substantial exotherm. Generally, the solutions formed will contain about 7% to about 80% by weight dissolved solids, and more particularly from about 40% to about 60% by weight dissolved solids.

In other embodiments the invention provides methods of making solid GUP/boric acid fire retardants by dewatering liquid compositions of GUP and boric acid. This method has the substantial advantage of producing solid fire retardant compositions that contain both GUP and boric acid. Moreover, the GUP and boric acid are typically evenly dispersed throughout the solids.

Thus, in one embodiment, the invention provides a method of making a solid fire retardant composition comprising dewatering an aqueous solution of GUP and boric acid. In one embodiment the compositions to be dewatered contains GUP and boric acid, and satisfy the GUP/boric acid conditions discussed above. For example, the amount of unreacted starting materials and unwanted by-products from the GUP reaction process are preferably less than 5 wt. % of the theoretical yield. However, it is not essential that the GUP be present in such high purity, and liquid processes such as those disclosed in Oberley '010 can also be used to produce starting solutions for the dewatering process.

The dewatering can be accomplished by a number of known techniques for separating solvent and solute, such as spray drying, thin film drying, or other drying techniques used by those skilled in the art of drying solutions containing high solids content. In a preferred embodiment, however, the liquid composition is dewatered by spray drying. This technique provides a dried product that is very flowable, uniform in composition, and dissolves quickly with less heating than conventional products. Moreover, the uniform, small size of the particles produced by spray drying allows them to be used in composite materials, such as oriented strand board ("OSB"), without the need for dissolution of the flame retardant prior to application. Moreover, these particles do not create dusting problems because the amount of small fines from the spray drying process can be controlled. This is in part due to the increased control over particle size provided by the spray drying process.

That a combination of GUP and boric acid could be successfully dewatered to provide a flowable, uniform, granular product is quite surprising in view of the difficulty with which pure GUP is produced. In fact, attempts to spray dry pure GUP were rather unsuccessful. When GUP is dissolved in water and heated to 80° C. and spray dried, the resulting product was very sticky, forming clumps of material and sticking to the sides of the drier. This is believed to be at least in part due to the low melting point of the GUP. Adding another component such as boric acid to the solution to be spray dried would have been expected to worsen this problem, since the added component would have been expected to lower the melting point of the resulting solid mixture. However, the addition of boric acid actually appears to have improved the physical properties of the product.

In the spray drying process, the GUP/boric acid solution is dispersed into fine droplets by an atomizer, and then fed into a stream of hot gas, usually concurrently, inside a drying chamber (often cylindrical). The heat from the gas vaporizes moisture in the droplets, leaving dried particles that can be separated from the gas stream. The entire operation typically takes less than about thirty (30) seconds.

Spray drying is especially advantageous because it typically results in the formation of spherical particles. Moreover, because the homogeneity of the solution typically dictates the homogeneity of solids in the particles, spray drying produces particulates that contain a uniform blend of the desired components. In addition, spray drying provides an easier way to obtain the desired bulk density, flow characteristics, and appearance than do other drying methods. Because the residence time in the drier is so short, thermal exposure is limited, leading to decreased degradation of heat sensitive materials.

A GUP/boric acid solution will typically be spray dried by introducing the solution to a spray drier inlet at a temperature ranging from about 200° C. to about 300° C., and removing the particles from the spray drier at a temperature ranging from about 65° C. to about 130° C. Those of skill in the art of spray drying will recognize that a number of operating parameters can and should be varied to optimize the spray drying process, and that these parameters to a large extent depend upon the size of the spray drier and the size of the particulates desired. For example, a larger diameter spray drier will generally be able to produce larger particles at the same heat duty, since the spray droplets will generally travel a greater distance through the hot gases before contacting the surface of the drier. Smaller dryers will generally require a higher inlet temperature than a larger drier in order to produce the same sized particles.

As mentioned above, the various dewatering processes of this invention, and especially the spray drying process, can also be used to manufacture fire retardant particles from materials other than GUP/boric acid. Preferred fire retardants include boric acid, the various salts of boric acid, and salts and acids of phosphates, sulfates, polyphosphates, phosphonites, and phosphonates. Still other fire retardants include dicyandiamide, GUP, boric acid, urea, and formaldehyde. In a particularly preferred embodiment, however, the fire retardant is a GUP/boric acid composition that satisfies one or more of the requirements discussed herein such as purity, homogeneity, and/or GUP/boric acid proportion.

IV. Methods of Using the Compositions of the Present Invention

The fire retardants of the present invention can be readily packaged and shipped to treatment or manufacturing plants for incorporation into composite wood products such as OSB and plywood, and other wood products. When used with solid wood products, this incorporation can be done using conventional techniques such as pressure treatment, wherein the product is dissolved into water prior to treatment. When used with composite wood products, the particles can be simply mixed with the wood sheets, fibers, chips, or particles without dissolution, or with the adhesive used to form the composite wood product, and the resulting mixture processed as normal to produce composite wood products.

Liquid treatment is generally the preferred method of treating any wood product that does not degrade under liquid treating conditions. Such wood products include processed sheets of wood such as plywood, structural member such as 2×4s, 2×6s, and 4×4s, and even wood chips used in the manufacture of composite wood products.

Thus, in one embodiment the invention provides a method for treating wood products with fire retardants, comprising contacting a wood product with a liquid fire retardant that comprises GUP and boric acid, wherein the amount of unreacted starting materials and unwanted by-products from the GUP reaction process are less than 5 wt. % of the theoretical yield. In another embodiment, the invention provides a wood product that comprises a fire retardant composition, wherein the fire retardant comprises GUP and boric acid, and wherein the amount of unreacted starting materials and unwanted by-products from the GUP reaction process are less than 5 wt. % of the theoretical yield. As mentioned above, the amount of impurities from the GUP reaction are preferably less than 4%, 3%, 2 wt. %, or 1% of the theoretical yield.

The percent solids concentration of the aqueous impregnating solution will be dictated to a large extent by the treating method employed and the degree of fire retardance required. Generally, the wood is impregnated with an amount of fire retardant equaling from about 5 to about 15% by weight of the wood, though the precise amount depends upon the fire retardant used and the type of wood species or wood product being treated. After being treated with the aqueous solution of fire retardant chemicals, the wood is thereafter dried in a conventional manner by exposure to ambient conditions or by heating to a temperature of from about 40° C. to about 70° C.

Solid wood products can be treated by one of the various techniques which are well known in the art. Examples of some of these methods are soaking, diffusion into green wood, vacuum pressure impregnation, and compression impregnation. The particular technique used will be determined by such factors as the species of wood being treated, the thickness of the wood, the degree of fire retardancy required and the end use of the treated wood product.

The homogenous solid fire retardants of the present invention are particularly useful in the preparation of composite wood products such as oriented strand board, plywood, random strand board, and particleboard, that contain processed wood particles, chips, fibers, or sheets of wood materials (a/k/a furnish) bound together with a suitable adhesive.

The term "composite wood products," as used herein refers to engineered wood such that it strengthens the wood products by bonding together with glue, optionally under pressure or heat from pieces of trees that have been peeled, chipped or sliced. In the manufacturing process, defects in the wood bits can be removed or dispersed, making the final product stronger than the original log. Composite wood preferably can carry nearly twice the load of an equivalent sawn piece of wood. Some non-limiting examples are glulam (glued-laminated timber made by gluing together horizontal layers of high strength dimension lumber pieces), Parallel Strand Lumber (PSL) (made from strands of wood glued together into long, wide members), Parallam® (brand of PSL), Laminated Veneer Lumber (LVL) (made from layered composite of wood veneers and adhesive such that the grain of each piece runs in the long direction, so it is strongest when edge loaded as a beam or face loaded as a plank), StrucLam®, plywood (made from thin veneers glued in layers with the grain of adjacent layers at right angles, or cross-lamination), E-Z Frame®, Oriented Strand Board (OSB) (made from strands of wood where two-way strength is provided by orienting the direction of the strands in different layers, where the strands in the outer faces are all oriented along the long axis, making the panel stronger lengthwise), Huber Blue, Huber Advantech, rim board, E-Z Rim® Board, Waferboard (made from strands of wood where the grain directions of the wafers are random, making strength and stiffness equal in all directions of the panel), Wood I-joists (I-shaped where the I is made of plywood or OSB, and the wider, upper and lower portions (flanges) are made of long lengths of LVL or high quality lumber), StructJoist® I joists, medium density fiberboard (MDF), Medite, Mediland, Synergite®, particleboard, MicroFine, MicroFiber, FF FiberCor, MultiFiber, Flake Face Novoply, MicroFine Novoply, Novoshelf, Novostep, Novodeck, Novowood, Aspenite, Aspenite T&G, Flakeboard, Duraflake, White Melamine Flakeboard, panelboard, Industrapanel, Hardboard, Masonite, tempered masonite, tempered pegboard, Dealer HBD, Fiber Face, Perfo-Square, Perfo-Round, Superwood, Lionite, PrimeTrim, and Fiberstrate.

The homogeneity and flowability of the solids allows them to be readily mixed with the furnish or adhesive melt in a composite wood product manufacturing process, and yields composite wood products in which the GUP and boric acid are substantially evenly dispersed. Thus, in another embodiment the invention provides furnish or an adhesive composition that comprises GUP and boric acid. The GUP and boric acid is preferably added to the furnish or adhesive resin as a homogenous composition, and as a plurality of flowable particulates. In another embodiment the invention provides a composite wood product that comprises GUP and boric acid.

While the invention is illustrated by the treatment of wood for convenience, other cellulo sic materials can be rendered flame resistant with the compositions of the invention, including paper, cardboard, cotton, jute and hemp. The invention can be more clearly understood by reference to the following examples, which are not intended to limit the scope of the invention or of the appended claims in any way.

EXAMPLES

Example 1

Dicyandiamide, phosphoric acid, and boric acid were mixed in a 1:1:1.42 mole ratio with sufficient water to form a 15% solids content solution. The mixture was heated to approximately 48° C. to dissolve all of the solids, and a sample for analysis taken. The temperature of the solution was then raised and maintained between 70° C. and 90° C. for 3.5 hours. Samples of the solution were analyzed by potentiometric titration every hour, and at the end of the 3.5 hour reaction period.

The samples were titrated against approximately 0.1 N NaOH (standardized against a potassium hydrogen phthalate standard from NIST). Because the pKa of GUP is very close to that for boric acid, the samples were each complexed with 10 g of mannitol to form a boric acid ester having a lower pKa that is more easily distinguishable from that of GUP. The results are given in Table 1,below, and plotted on FIG. 1.

TABLE 1

| Reaction time (hours) | GUP Yield (wt. %) |
|---|---|
| 0 | 0.84 |
| 1 | 28.4 |
| 2 | 43.9 |
| 3 | 65.6 |
| 3.5 | 71.2 |

FIG. 1 shows a substantially linear increase in GUP yield with time, such that GUP yield will presumably continue to increase as the reaction time is increased, as would be expected from the greater yields seen in examples presented below. The samples only exhibited equivalence points for GUP (pKa=7.25) and the boric acid ester of mannitol (pKa=4.50).

Comparative Example 1 (Oberley '010)

A 15% solids content solution was prepared by mixing dicyandiamide and phosphoric acid in a 1:1 molar ratio in water. The mixture was heated to 80° C. and maintained at that temperature for 3.5 hours. After the 3.5 hours had elapsed, sufficient boric acid was added to yield a molar ratio of boric acid:dicyandiamide of 1.38:1. Samples were taken at various times during the reaction to monitor the GUP concentration, and are presented in Table 2 below.

TABLE 2

| Reaction time (hrs) | GUP Yield (wt. %) |
|---|---|
| 0 | 6.03 |
| 1 | 46.0 |
| 2 | 57.5 |
| 2.75 | 63.6 |
| 3.5 | 63.6 |

Figure 2:
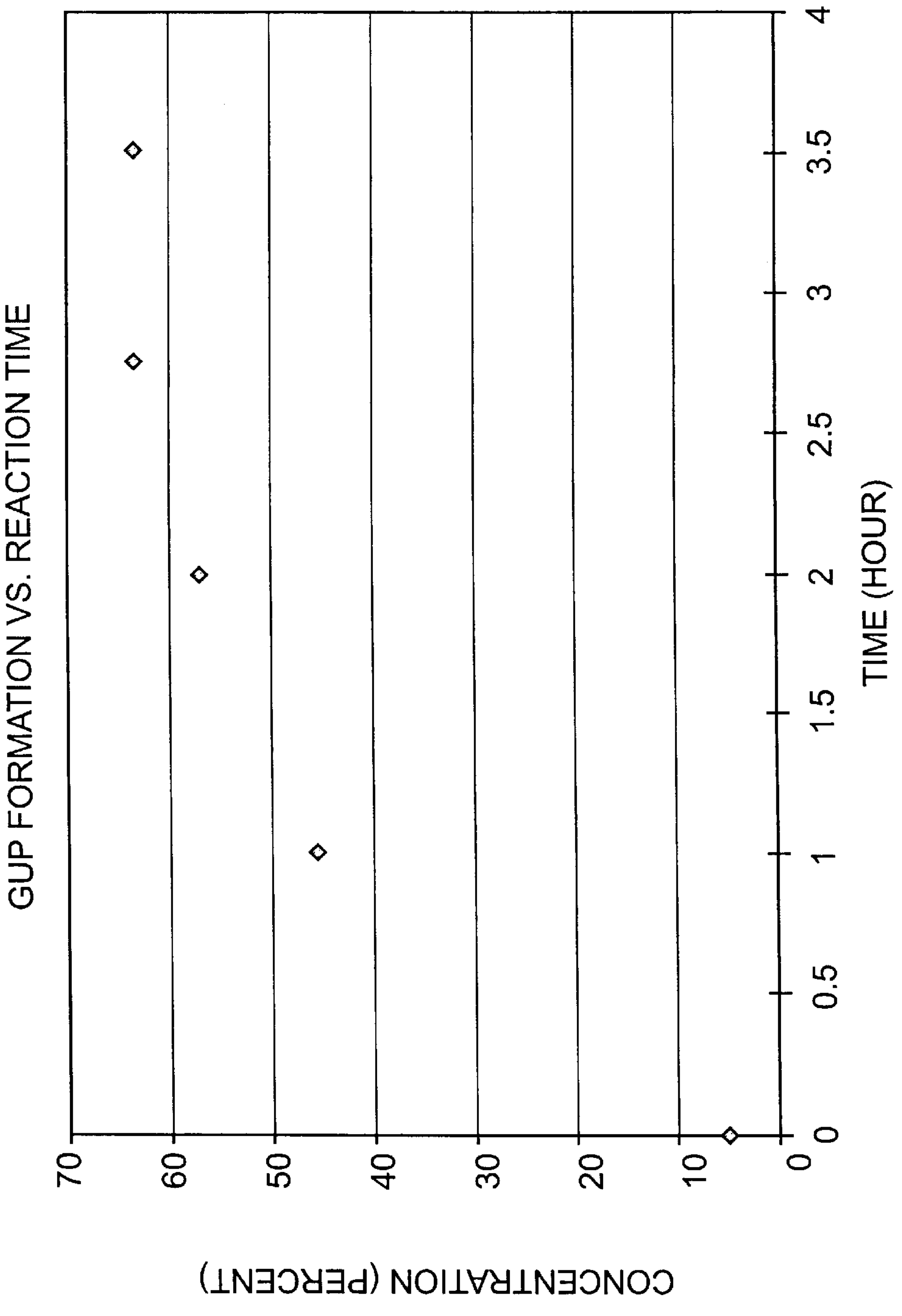
FIG. 2 is a plot of the asymptotic reaction kinetics observed when producing GUP/boric acid fire retardants by the methods of the prior art.
Figure 3A:
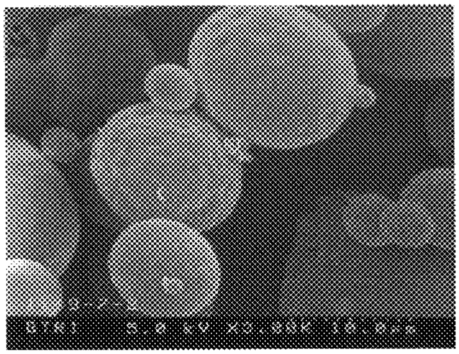
FIGS. 3A, 3B, 3C, and 3D are scanning electron photomicrographs at various magnifications of flame retardant product prepared according to one embodiment of the invention.
Figure 3B:
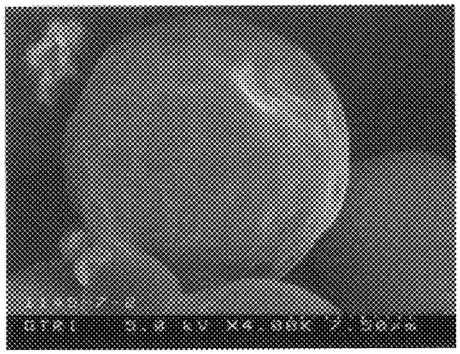
Figure 3C:
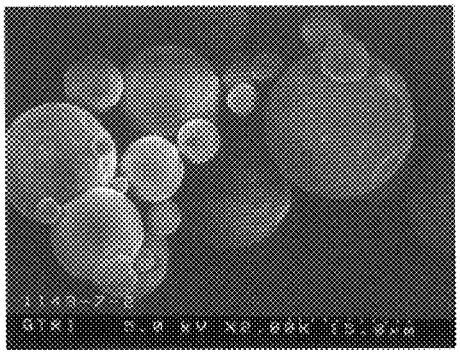
Figure 3D:
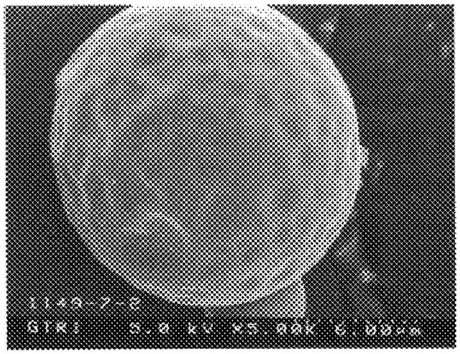
Figure 4A:
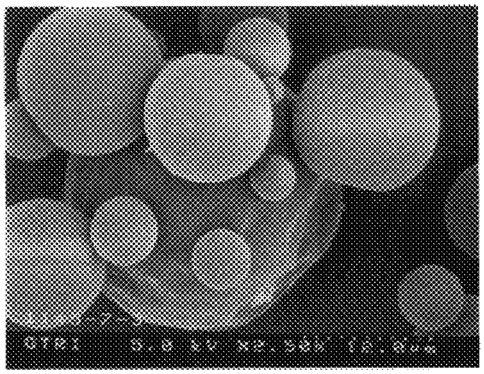
FIGS. 4A, 4B, 4C, and 4D are scanning electron photomicrographs at various magnifications of flame retardant product prepared according to one embodiment of the invention
Figure 4B:
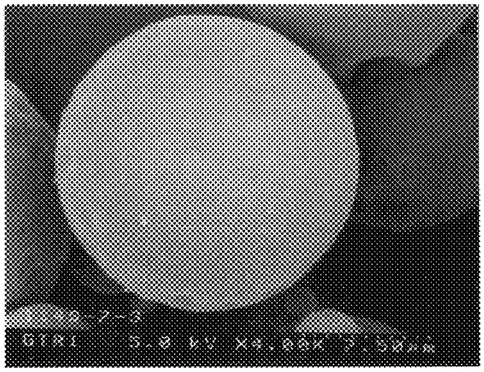
Figure 4C:
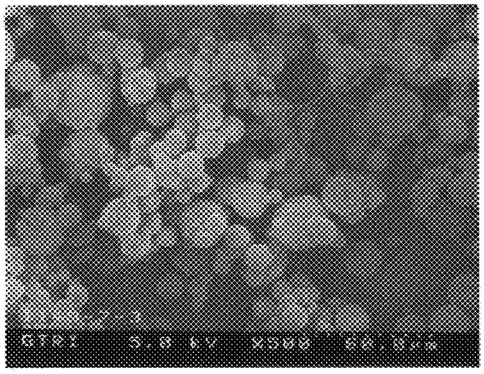
Figure 4D:
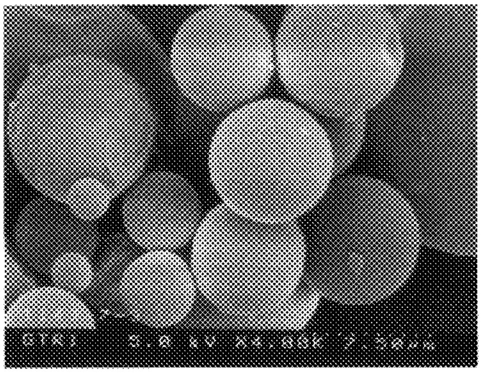
Figure 5A:
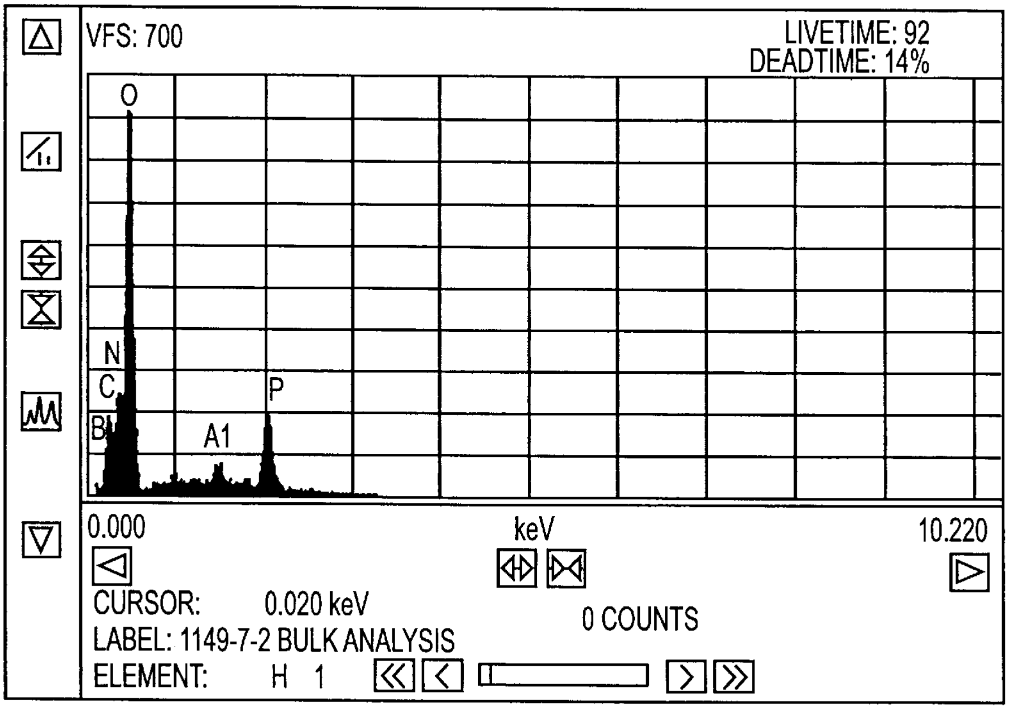
FIGS. 5A and 5B are graphs showing the results of energy dispersive X-ray analysis of bulk and individual particles, respectively, of the flame retardant product shown in FIG. 3.
Figure 5B:
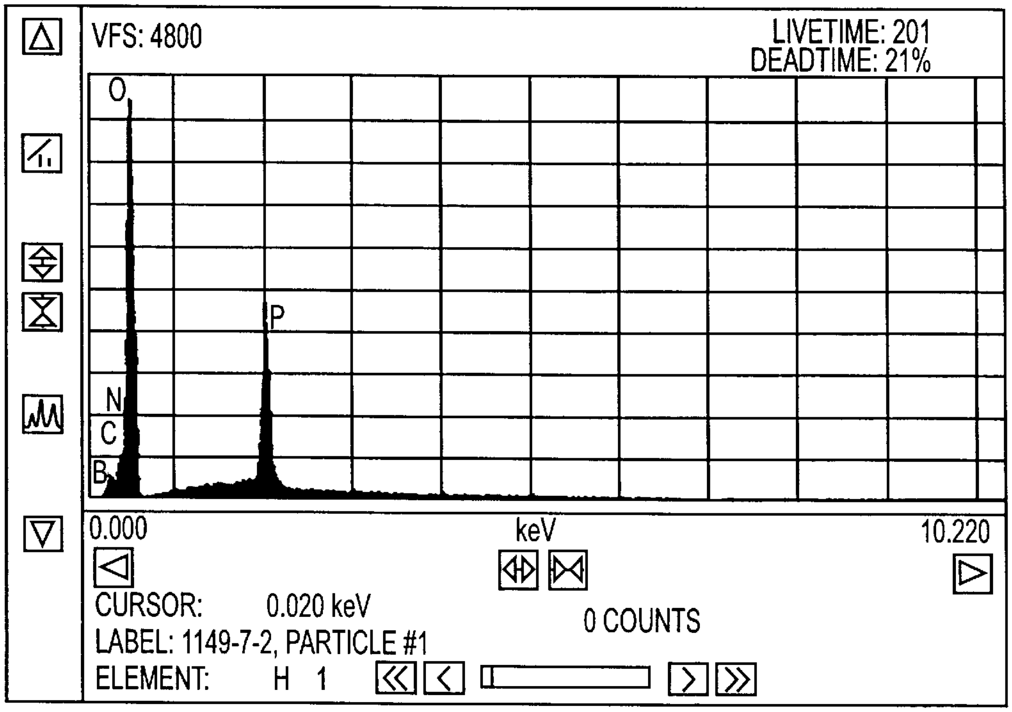
Figure 6A:
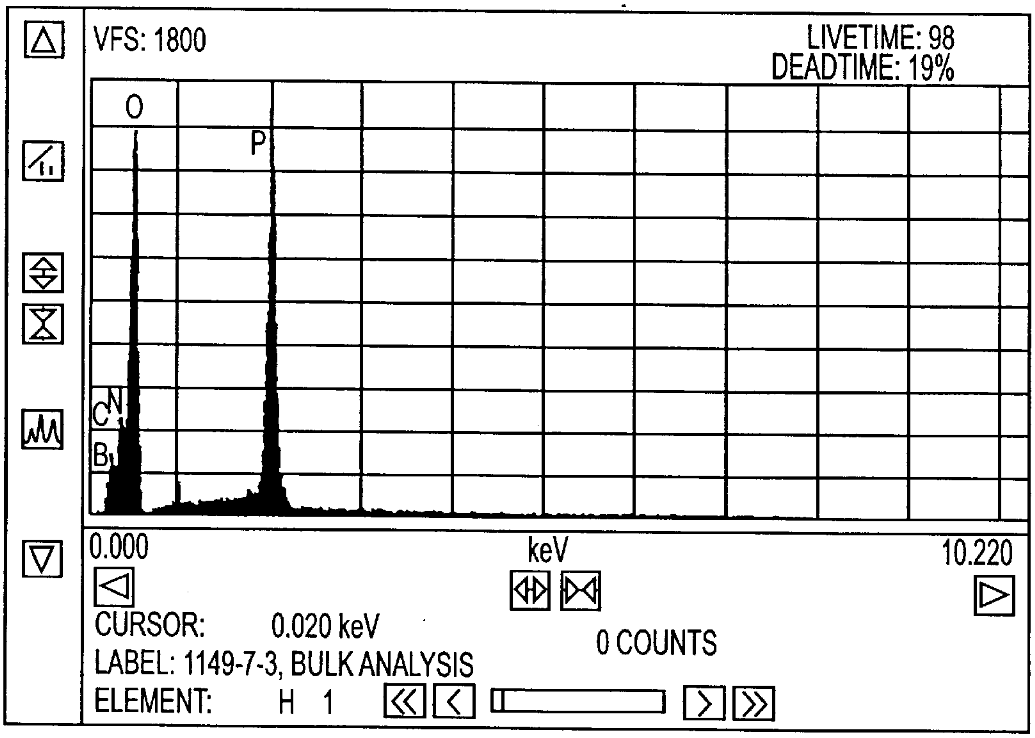
FIGS. 6A and 6B are graphs showing the results of energy dispersive X-ray analysis of bulk and individual particles, respectively, of the flame retardant product shown in FIG. 4.
Figure 6B:
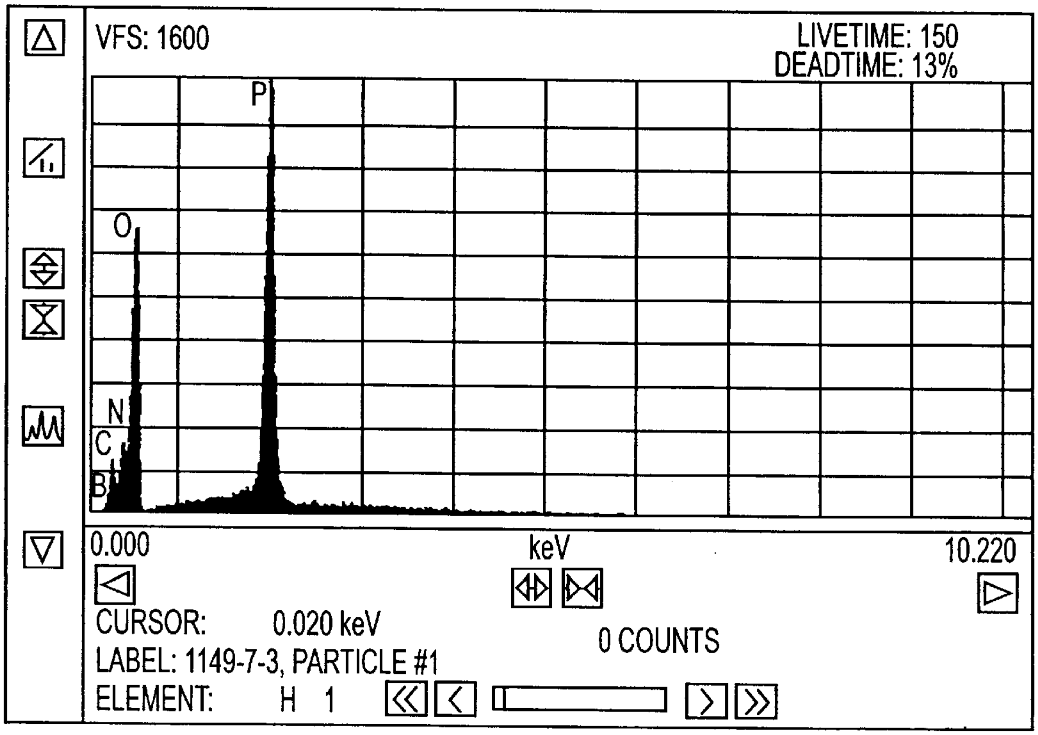

As indicated in Table 2, the GUP concentration rises to a maximum of 63.6 wt. % at approximately 2.75 hours, after which the reaction appears to cease. These asymptotic kinetics are plotted in FIG. 2.

Comparative Example 2 (Oberley '010)

Dicyandiamide and boric acid were dissolved in water in a 1:1.38 molar ratio to form a 20% solids content solution. This mixture was heated with stirring to 80° C. and maintained at a temperature between 70° C. and 90° C. for 35 minutes, and then phosphoric acid was added, in an amount such that the molar ratio of dicyandiamide, phosphoric acid, and boric acid was 1:1:1.38. No solids were observed in the solution, which was then cooled to room temperature. No precipitation was observed even with cooling. The solution was analyzed by potentiometric titration, as described above. The yield of GUP was found to be 67.4%, and the third equivalence point at pKa=3.2 was observed.

Comparative Example 3 (Oberley '010)

Dicyandiamide and phosphoric acid (85%), in a 1:1 molar ratio, were mixed with sufficient water to form an approximately 50% solids solution. This mixture was then heated with stirring to 80° C. and maintained at a temperature between 70° C. and 95° C. for 35 minutes. Boric acid was then added (in a mole ratio to dicyandiamide of 1.38:1) to the cloudy mixture, and the mixture cooled to room temperature. The mixture was then diluted to about 10% to allow more complete dissolution of solids, and samples were taken for potentiometric titration. Titration was performed as in Example 1, and showed that the yield of GUP in this experiment was 91.2%.

The experiment was then repeated, except that after the 35 minute period, the temperature was raised to approximately 98° C. to dissolve all of the solids, and this temperature was maintained after boric acid addition. Samples were taken on complete dissolution of the dicyandiamide and phosphoric acid, after 35 minutes of reaction time, and after the boric acid was added and dissolved (about 30 minutes). The GUP concentration for each sample was determined by potentiometric titration, and is given below in Table 3.

TABLE 3

| Reaction Time (minutes) | GUP yield (wt. %) |
|---|---|
| 0 (dicyandiamide and phosphoric acid addition) | 56.9 |
| 35 | 90.7 |
| ~65 (boric acid dissolution) | 94.9 |

Titration of the GUP/boric acid mixture yielded three equivalence points, one for GUP (pKa=7.25), another for the boric acid ester of mannitol (pKa=4.50), and a third at approximately 3.20. This pKa was too high to be unreacted phosphoric acid (pKa—2.15), and is believed to be a phosphoric acid-dicyandiamide salt.

Example 2

Solutions of GUP and boric acid were made by adding dicyandiamide, phosphoric acid, and boric acid simultaneously to water and heating to dissolution. Solutions having from about 40% to about 60% dissolved solids, of which about 29.3% was dicyandiamide, 34.1% was phosphoric acid, and about 30.6% was boric acid, were initially formed (corresponding to a 1:1:1.42 mole ratio) and heated to about 95–98° C. with stirring to dissolve the solids. Care was taken to prevent an exotherm from the solution.

Upon dissolution of the solids, the solutions were fed to an 80 cm pilot plant spray drier using inlet temperatures of 200, 250, and 300° C. and outlet temperatures between about 98° C. and 127° C. The resulting products were free flowing, with no visual degradation. Low magnification microscopy showed spherical particles with some agglomeration, probably due to electrostatic attraction, and the small particle sizes (less than 50 μm) of some of the particles produced.

The dried products produced above were analyzed by scanning electron microscopy (SEM) and energy dispersive X-ray analysis (EDAX). SEM photomicrographs of the solids are shown in FIG. 3 and FIG. 4. The product shown in FIG. 3 was obtained from a 40% solids solution at an inlet temperature of 300° C. and an outlet temperature of 119° C. The product shown in FIG. 4 was obtained from a 40% solids solution at an inlet temperature of 300° C. and an outlet temperature of 124° C. Both sets of photomicrographs show intact, spherical particles, having a range of particle sizes. The majority of particles are between about 7 and about 17 μm; there do not appear to be any particles larger than 50 μm. EDAX performed on a bulk sample and on individual particles showed the presence of phosphorus and boron among and within individual particles.

The compositions of each batch of dried products produced above was also analyzed by potentiometric titration. Approximately 0.1000 g of solid product was combined with about 10 g mannitol and titrated against 0.1 N NaOH. The mannitol was added to react with the boric acid to for a borate ester, which has a much lower equivalence point than GUP. Titration showed the solids to have an average composition of 66.8% GUP and 33.2% boric acid, very close to the theoretical yield of 70:30 GUP/boric acid. The loss in yield was attributable to the short reaction time allowed in this example. A kinetic analysis was subsequently undertaken, and it was determined that an increase in GUP yield could be obtained by increasing the reaction time, as indicated in Table 4 below.

TABLE 4

| REACTION TIME (hr) | GUP YIELD (%) |
|---|---|
| 0 | 93.2 |
| 1 | 97.3 |
| 2 | 98.8 |
| 4 | 99.4 |
| 5 | 99.6 |

The bulk density of the dried products obtained above was measured and found to be about 0.848 g/cm$^3$. Moisture content for the dried products produced at various feed solutions and temperatures were also measured and are reported below in Table 5.

TABLE 5

| % Solids Feed | Inlet Temp. (° C.) | Outlet Temp. (° C.) | Moisture Content (%) |
|---|---|---|---|
| 60 | 199 | 103 | 1.90 |
| 40 | 199 | 99 | 2.61 |
| 40 | 250 | 103 | 3.46 |
| 40 | 300 | 114 | 3.54 |
| 40 | 300 | 119 | 3.22 |
| 40 | 300 | 124 | 4.15 |

While not wishing to be bound by any theory, it is believed that the higher temperatures associated with higher moisture contents resulted in the outside of the particles drying faster, trapping more moisture inside, since the particles spend less time in the drying chamber at higher temperatures. As a result, it is believed that either lower temperatures or longer residence times, or both, would result in more even drying, and lower moisture Solubility of the dried products prepared above was evaluated by preparing 15 wt. % and 20 wt. % solutions in water. It was found that a 15 wt. % solution could be prepared at room temperature after stirring for 2.5 to 3 hours, and resulted in some clumping of particles in the water. A 20 wt. % solution could be prepared by heating to 45° C.

Storage stability was also evaluated to determine whether solids would cake or clump in storage. A beaker of the dried products produced above was exposed to atmospheric conditions in the laboratory, and another beaker of solids was placed in a desiccator with a beaker of water to simulate 100% humidity conditions. The solids exposed to 100% humidity showed caking after about 24 hours, while the solids exposed to atmospheric conditions did not cake until after about 3 weeks.

Example 3

Water and phosphoric acid were steam heated in a reactor while slowly adding dicyandiamide and boric acid in sufficient quantities to yield a 35–40% solids solution. The temperature was maintained at about 92° C. and monitored closely to prevent solidification of material in the pump lines. After dissolution of the solids, the solution was pumped to a 9 ft diameter spray drying chamber. Inlet and outlet temperatures were 370° F. and 160° F. Microscopic examination of the particles indicated both crystalline and spherical particles. The size distribution of the particles is listed below in TABLE 6. It is believed that very few, if any particles were actually over 100 μm in size, and that the small quantity of particles that fell into this size range, as listed in TABLE 6 were in fact agglomerates.

TABLE 6

| Particle Size (Φm) | Percent of Total Sample |
|---|---|
| >150 | 1.96 |
| 150 > 106 | 4.46 |
| 106 > 75 | 13.9 |
| 75 > 53 | 48.7 |
| 53 > 45 | 11.2 |
| 45> | 19.7 |

Titrational analysis of the spray dried product revealed that it contained 68% GUP (representing a 97% yield) and 32% boric acid. This analysis was confirmed by ICP (inductively coupled plasma spectrophotometer). Bulk density was determined to be 0.781 g/cm$^3$, and the moisture content was found to be 9.49%.

Example 4

Fire retardant treated random strand board (RSB) was produced by incorporating the spray dried solids obtained in Example 3 into the furnish prior to board formation. RSB was chosen for these tests rather than OSB because it represents a good laboratory model for OSB, and the results obtained from RSB generally correlate well with results one would expect to obtain from OSB.

More specifically, water, slack wax, and LPF (liquid phenol formaldehyde) face and core resins were first added to Aspen wood strands. Spray dried GUP/boric acid solids were then added to the strands in a drum blender in sufficient amount to form a 7.5% w/w board, and the mixture was tumbled to evenly distribute the powder. The strands were then laid and pressed into 7/16 inch nominal boards. Various specifications of the panel are given below in Table 7.

TABLE 7

| | |
|---|---|
| Thickness | 0.437 in. |
| Density | 40 pcf (plus chemical add-on) |
| Resin content | 3.9% face; 3.9% core |
| Mat construction | Random 50/50 |
| Wax content | 1% slack wax |
| Strand type | Commercial |

TABLE 7-continued

| | |
|---|---|
| Moisture content | 7% face; 4% core |
| Press time | 195 sec. |

Samples of treated and untreated (control) RSB (prepared using the process described above, but without the addition of GUP/boric acid solids) were burned using a five minute horizontal laboratory burn test. Twelve inch square samples were clamped horizontally 19.5 inches from the counter surface and were checked using a level. A Bunsen burner with a propane gas supply was calibrated to produce an 11 inch flame and placed 7.75 inches below the center of the exposed surface of the sample. The flame was ignited and held under the sample for 5 minutes. Once removed, the weight loss and charred area were determined. These parameters are indicative of the flame spread performance that the product would have in a larger scale test, and are used to determine if a particular additive has any fire retardant effect on the wood substrate.

The Burner was adjusted following the practice described in ASTM standard E 69, which provides:

"Adjust burner to give a blue flame approximately 11" in height, with a tall distinct inner cone. Place the burner within an empty fire tube so that the top of the burner is even with the top of the opening in the screen section. Regulate the flame further to produce a temperature of 356±9° F. at the top of the fire tube. Use a manometer to regulate the gas supply and to maintain a constant gas supply to the burner after the flame has been adjusted, unless a suitable gas-pressure regulator is employed. When the adjustment is satisfactory, withdraw the lighted burner from the fire tube."

In the lab fire test, the untreated (control) Aspen RSB lost 22.5% of its original weight at the end of the 5 minute test, as indicated in Table 8 below. During the test, flames were lapping over all sides of the sample and some charring was seen on the top surface of the sample. After the flame was removed, the board continued to burn until the flames were extinguished. The treated RSB, by contrast, lost only 5.5% of its original weight. Moreover, the char area was reduced by 56.7% over the control.

TABLE 8

| SAMPLE | WEIGHT LOSS (%) | CHAR AREA ($in^2$) |
|---|---|---|
| Aspen RSB (untreated) | 22.5 | 125.2 |
| Aspen RSB (treated) | 5.5 | 54.2 |

The invention having been thus described, it will be apparent that various modifications and variations thereof can be made by those of skill in the art.

What is claimed is:

1. A guanylurea phosphate (GUP)/boric acid formulation that has greater than 97 percent purity.

2. The formulation of claim 1 wherein (1) the formulation is produced by a GUP reaction process that has an associated theoretical GUP yield, and (2) the amount of unreacted starting materials and unwanted by-products from the GUP reaction process are less than 2 wt. % of the theoretical GUP yield.

3. The formulation of claim 1 wherein (1) the formulation is produced by a GUP reaction process that has an associated theoretical GUP yield, and (2) the amount of unreacted starting materials and unwanted by-products from the GUP reaction process are less than 1 wt. % of the theoretical GUP yield.

4. The formulation of claim 1, wherein the formulation does not exhibit a titration equivalence point at a pKa of about 3.2.

5. The formulation of claim 1, in the substantial absence of a dicyandiamide/phosphoric acid salt.

6. The formulation of claim 1 in the form of a solid, wherein the GUP and boric acid are substantially evenly dispersed throughout the formulation.

7. The formulation of claim 1 in the form of solid particulates, wherein the GUP and boric acid are substantially evenly dispersed throughout the formulation.

8. The formulation of claim 1 in the form of solid flowable particulates.

9. The formulation of claim 1 in the form of solid spherical particulates.

10. The formulation of claim 1 in the form of solid particulates having a substantially narrow size distribution.

11. The formulation of claim 1 in the form of solid particulates having an average diameter of less than 50 microns.

12. The formulation of claim 1 in the form of solid particulates substantially in the absence of fines.

13. The formulation of claim 1 that does not exhibit a titration equivalence point at a pKa of about 3.2.

14. The formulation of claim 1 further comprising a cellulosic material.

15. The formulation of claim 14 in the form of a composite wood product.

16. The formulation of claim 14 in the form of composite wood furnish.

17. A method of treating cellulosic materials for fire retardance comprising contacting the cellulosic material with the formulation of claim 1.

18. A solid guanylurea phosphate (GUP)/boric acid formulation that has an even dispersion of GUP and boric acid.

19. The formulation of claim 18 in the form of a solid fire retardant formulation.

20. A solid guanylurea phosphate (GUP)/boric acid formulation that has a solubility of at least 70% in water.

21. A fire retardant composition in the form of solid flowable particulates, comprising a guanylurea phosphate (GUP/boric acid formulation.

22. The fire retardant composition of claim 21 the form of solid spherical particulates.

23. The fire retardant composition of claim 21 in the form of solid particulates having a substantially narrow size distribution.

24. The fire retardant composition of claim 21, in the form of solid particulates having a mean diameter of less than 50 microns.

25. A method of producing guanylurea phosphate (GUP)/boric acid fire retardants comprising reacting dicyandiamide and phosphoric acid under conditions that yield substantially linear reaction kinetics.

26. The method of claim 25 comprising dissolving in water, substantially simultaneously, dicyandiamide, phosphoric acid, and boric acid, and reacting at least a portion of the dicyandiamide and the phosphoric acid to form guanylurea phosphate.

27. The method of claim 25 performed under conditions that inhibit the evolution of heat from the reaction.

28. The method of claim 25 comprising:

a) providing an aqueous bath, b) adding phosphoric acid to the bath, c) adding dicyandiamide to the bath, d) adding boric acid to the bath, and e) heating the bath, or allowing it to heat, to a temperature that does not yield a substantial exotherm, f) wherein: steps (a)–(d) are performed simultaneously, consecutively, or in any order, and step (e) is performed after steps (a)–(d).

29. A method of producing guanylurea phosphate (GUP)/boric acid solids having greater than 95 percent purity comprising dewatering an aqueous solution that comprises GUP and boric acid.

30. The method of claim 29 wherein the dewatering is effected via spray drying.

31. A guanylurea phosphate (GUP)/boric acid formulation that has greater than 95 percent purity, in the form of a solid, wherein the GUP and boric acid are substantially evenly dispersed throughout the formulation.

32. A guanylurea phosphate (GUP)/boric acid formulation that has greater than 95 percent purity, in the form of solid flowable particulates.

* * * * *